United States Patent
Escaffre et al.

(10) Patent No.: US 6,878,191 B2
(45) Date of Patent: Apr. 12, 2005

(54) PHOTOCATALYTIC COMPOSITION

(75) Inventors: Pascale Escaffre, La Cote Saint Andre (FR); Pierre Girard, Saint Ismier (FR); Joseph Dussaud, Vienne (FR); Léonie Bouvier, Beauvoir de Marc (FR)

(73) Assignee: Ahlstrom Research and Services, Pont Eveque (FR)

( * ) Notice: Subject to any disclaimer, the term of this patent is extended or adjusted under 35 U.S.C. 154(b) by 0 days.

(21) Appl. No.: 10/838,023

(22) Filed: May 3, 2004

(65) Prior Publication Data

US 2004/0204314 A1 Oct. 14, 2004

Related U.S. Application Data

(62) Division of application No. 09/647,650, filed as application No. PCT/FR99/00748 on Mar. 31, 1999.

(30) Foreign Application Priority Data

Apr. 3, 1998 (FR) ............................................. 98 04401

(51) Int. Cl.[7] ............................................... B01D 46/30
(52) U.S. Cl. ....................................................... 95/274
(58) Field of Search ................... 95/274, 275; 502/242, 502/350

(56) References Cited

U.S. PATENT DOCUMENTS 5,972,831 A   10/1999   Poncelet et al. ............. 502/304

FOREIGN PATENT DOCUMENTS

| EP | 0737513 A1 | 10/1996 | ............ B01J/21/06 |
| EP | 0923988 A1 | 6/1999 | ............ B01J/35/02 |
| JP | 08 259891 | 10/1996 | |
| JP | 09 171801 | 6/1997 | |
| JP | 09 262483 | 10/1997 | |

OTHER PUBLICATIONS

V.N. Parmon; Catalysis Today, Photocatalysis and Solar Energy Conversion,; Dec. 17, 1997; vol. 39, No. 3; 221–222.

*Primary Examiner*—Stanley S. Silverman
*Assistant Examiner*—Edward M. Johnson
(74) *Attorney, Agent, or Firm*—Heslin Rothenberg Farley & Mesiti P.C.; Mary Louise Gioeni, Esq.

(57) ABSTRACT

A photocatalytic composition includes at least a photocatalyst agent and at least an inorganic binding agent, characterized in that the inorganic binding agent includes an aqueous colloidal silica dioxide ($SiO_2$) dispersion, the aqueous colloidal silica dioxide dispersion including particles capable of being bound to one another after coating the photocatalyst agent.

15 Claims, 1 Drawing Sheet

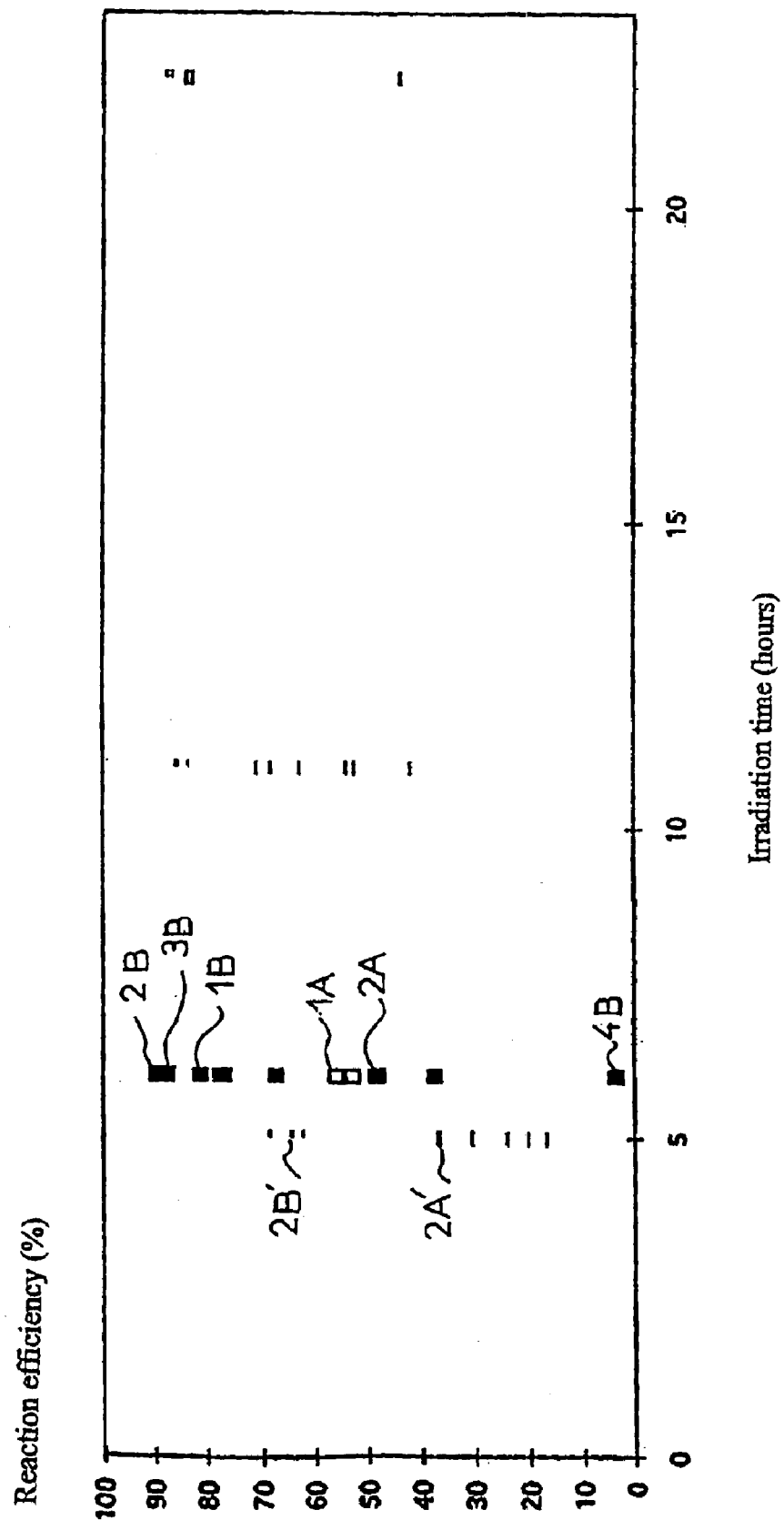

PHOTOCATALYTIC COMPOSITION

CROSS REFERENCE TO RELATED APPLICATIONS

This application is a divisional of U.S. Pat. No. 09/647,650, filed Oct. 3, 2000, which is a U.S. National Phase filing under 35 U.S.C. §371, claiming priority from International Application No. PCT/FR99/00748, filed on Mar. 31, 1999, and published in French on Oct. 14, 1999, as WO 99/51345, which claims priority from French patent application 98.04401, filed on Apr. 3, 1998, the entire disclosures of which are incorporated herein by reference.

The invention relates to a novel photocatalytic composition, to its manufacturing process and to its use.

It also relates to a filtering medium covered with this photocatalytic composition, as well as to its manufacturing process and to its use.

In the rest of the description and in the claims, the term "photocatalytic agent" denotes an agent capable of destroying the various organic pollutants present in the air or in water, by a photochemical reaction caused by ultraviolet (UV) irradiation. This chemical reaction is known widely by the term "photocatalytics" and is used for the treatment of air or water.

Schematically, the photocatalytic reaction is initiated by activating a semiconductor solid by UV radiation at a wavelength of less than 380 nanometers, causing electronic changes within the semiconductor and resulting, in the presence of air or water, in the creation of oxygen-containing radicals at the surface of the semiconductor. These radicals attack the organic compounds adsorbed on the semiconductor and, by a succession of chemical reactions involving the oxygen in the air or water, degrade the organic compounds until the carbon of the carbon chains is completely converted into carbon dioxide ($CO_2$).

The photocatalytic reaction is able to convert, via the process described above, a large number of pollutants in the air, and especially $NO_x$, $NH_3$, $H_2S$, CO, $O_3$, chlorinated or nonchlorinated $C_2$–$C_4$ alkenes, chloromethane, iso-octane, benzene, toluene, xylene, isopropylbenzene, $C_1$–$C_4$ saturated aliphatic alcohols, methyl mercaptane, chlorophenol, nitrophenol, methyl tert-butyl ether, dimethoxymethane, $C_1$–$C_4$ aldehydes, acetone, formic acid, acetic acid, 2-methylpropanoic acid, dichloroacetyl chloride, dimethylformamide, trimethylamine, acetonitrile and pyridine.

In practice, anatase titanium dioxide $TiO_2$ is used as the semiconductor solid, that is to say as the photocatalyzing agent, which titanium dioxide, activated by UV light, is electronically modified so as to lead to the formation of hydroxyl radicals $OH^\bullet$ and oxygen radicals $O^\bullet$ capable of attacking the organic compounds adsorbed on the $TiO_2$ by degrading them until the organic carbon is completely converted into carbon dioxide.

However, it is possible to use other photocatalyzing agents such as, for example, those chosen from the group of metal oxides, alkaline-earth oxides, actinide oxides and rare-earth oxides.

For the treatment of air and of liquid effluents, it is necessary to fix the photocatalytic compositions by means of binding agents onto supports, especially fibrous supports or glass-fiber supports. In the rest of the description and in the claims, this "photocatalytic composition/support" combination is referred to by the term "filtering medium".

It was proposed a long time ago to use, as the binding agent, organic molecules of the type comprising polyvinyl acetate, polyvinyl alcohol, etc.

It has rapidly been found that this use could not be satisfactory if the carbon chains of the binder are also subjected to the photocatalysis process and are therefore degraded, so that the lifetime of the composition would be limited thereby.

To solve this problem, various techniques have been proposed, consisting in removing the carbon from the binder by calcining, especially the technique of fixing the catalyst by PMTP (Previously Made Titanium Powder) or else by CVD (Chemical Vapor Deposition), these techniques being described in particular in the Journal "CATALYSIS TODAY", Vol. 39, No. 3, Pages 221 and 222.

However, this type of technique has a number of drawbacks, such as that of increasing the duration and the cost of preparing the composition. Furthermore, and above all, the calcining carried out at temperatures of about 1700° C. results in the formation of a powder which makes the composition difficult to use.

To solve this problem, it has been proposed, in document FR-A-2 749 777, to replace the organic binder with an inorganic binder consisting of an inorganic aluminosilicate polymer, of the imogolite type.

The photocatalytic composition described in that document is in the form of an aluminosilicate gel to which a colloidal solution of a photocatalyzing agent is added. The time required to prepare the aluminosilicate gel is of the order of a few days and requires a multitude of relatively complicated steps. A thixotropic gel transparent to solar radiation is obtained, which has to be fluidized by agitation in order to allow uniform coating on a support.

More specifically, in order to manufacture a filtering medium, the gel obtained is applied to a support and then dried using an unspecified technique. The various trials show that, depending on the light source used, only about 12 or 26% of the pollutants are destroyed (see Example 3).

Although the photocatalytic composition described in that document has the advantage of being able to be coated on a support as a single layer, the preparation of the composition is not only very complicated but it also leads to inadequate results.

To solve this problem, it has been proposed, in documents JP-A-09/171801 and WO-A-97/00134, to coat the photocatalytic composition as such on a support, via an adhesive layer. The adhesive layer consists of a resin which may comprise, in certain embodiments, from 5 to 40% by weight of colloidal silica.

In other words, this solution has the drawback, on the one hand, of increasing the number of steps needed to manufacture a filtering medium (coating of two successive layers on the support), and, on the other hand, of using resins, which are by definition organic, which can be consumed during the photocatalysis process.

One of the problems that the invention aims to solve is that of providing a photocatalytic composition which is simple to prepare from commercially available constituents and is capable of being coated directly on a support.

Another problem that the invention aims to solve is to improve the adsorptivity and the photocatalytic effectiveness, that is to say the efficiency of the photocatalyzing agent.

To solve the problem of providing a composition simple to use and capable of being applied to a substrate as a single layer, the invention proposes a photocatalytic composition comprising at least one photocatalyzing agent and at least one inorganic binding agent, characterized in that the inorganic binding agent comprises an aqueous colloidal dispersion of silicon dioxide ($SiO_2$), said aqueous colloidal dispersion of silicon oxide comprising silica particles capable of bonding together after having coated the photocatalyzing agent.

"Aqueous colloidal dispersion of silicon dioxide ($SiO_2$)" should be understood to mean a negatively charged dispersion of amorphous silica particles, of high specific surface area, in water. In practice, the specific surface area of the silica particles is greater than 80 $m^2/g$, advantageously 100 $m^2/g$, for a particle size of between 25 and 30 nanometers. Likewise, it is greater than 300 $m^2/g$, advantageously 350 $m^2/g$, for a particle size of between 4 and 6 nanometers. On their surface, the silica particles have OH groups and $OH^-$ ions which form an electric double layer, thus giving said particles self-bonding properties. As already stated, the silica particles are capable of bonding together after having coated the particles of photocatalyzing agents.

To solve the problem of how to improve the adsorbtivity and the photocatalytic effectiveness of the composition, the binding agent consists exclusively of an aqueous colloidal dispersion of silicon dioxide ($SiO_2$).

It seems in fact quite surprising that the use of an aqueous colloidal dispersion of $SiO_2$ of the type described above makes it possible to significantly improve the degree of adsorption of the polluting substances on the photocatalyzing agent as well as the efficiency of the photocatalysis, this being probably due to the self-bonding properties of the $SiO_2$ particles.

According to a first characteristic of the invention, the $SiO_2$ particles represent from 20 to 50% by weight, advantageously 48% by weight, of the colloidal aqueous dispersion.

For a concentration of less than 20%, the photocatalyzing agent is less resistant to rubbing and is transformed into a powder.

For a concentration of greater than 50%, the photocatalyzing agent loses its activity.

According to another characteristic of the invention, the silicon dioxide particles forming the aqueous dispersion have a diameter of between 10 and 50 nanometers, advantageously between 20 and 30 nanometers.

Advantageously, anatase titanium dioxide ($TiO_2$) alone is used as the photocatalyzing agent.

However, the photocatalyzing agent may also result from mixing several agents, such as $TiO_2$, cerium oxide, etc.

To improve the photocatalytic effectiveness, the titanium dioxide ($TiO_2$) particles have a diameter of between 10 and 30 nanometers.

Likewise, to obtain optimum adsorption effectiveness, the photocatalytic composition comprises from 10 to 60 parts (as dry matter) of the aqueous colloidal dispersion of silicon dioxide, the balance to 100 parts consisting of anatase $TiO_2$.

Advantageously, the photocatalytic composition comprises 50 parts of the aqueous colloidal dispersion of silicon dioxide and 50 parts of anatase titanium dioxide.

According to another embodiment of the invention, so as to prevent the development of undesirable microorganisms and fungi contained in the ambient air, the photocatalytic composition furthermore comprises zeolites modified by metal ions.

The term "zeolites" denotes a group of natural hydrated aluminosilicates of alkali or alkaline-earth metals.

In practice, the metal ions are chosen from the group comprising silver, copper and zinc and are used in an amount from 1 to 3%. Advantageously, the zeolite is modified with 1.5% of silver ions.

It has in fact been found that this type of composition makes it possible to accelerate the destruction of the microorganisms and fungi contained in the ambient air while still destroying the organic pollutants giving rise to certain odors, by combining the properties of the modified zeolites with those of the photocatalysis described above.

According to an advantageous embodiment of the invention, the photocatalytic composition consists (by weight) of:

30 to 50%, advantageously 47%, $SiO_2$ 30 to 50%, advantageously 47%, anatase $TiO_2$ 2 to 10%, advantageously 6%, zeolite containing 2% silver.

According to another embodiment of the invention, so as to adsorb the organic molecules present in the pollution peaks, the photocatalytic composition furthermore includes active carbon.

In a known manner, the active carbon is present in the form of fibers or particles having a high specific surface area and thus allowing the organic molecules to be adsorbed.

Consequently, the photocatalytic composition, by including active carbon, will act on the ambient air in two stages, firstly, adsorption of the polluting agents present in the pollution peaks on the active carbon;

then, photocatalysis degrading the pollutant contained in the active carbon, thus allowing said active carbon to be regenerated.

In other words, the lifetime of this composition will be greatly increased over the lifetime of the active carbon alone.

According to one advantageous version of this embodiment, the photocatalytic composition consists (by weight) of:

10 to 40%, advantageously 25%, anatase $TiO_2$;

10 to 40%, advantageously 25%, active carbon;

40 to 60%, advantageously 50%, $SiO_2$.

The invention also relates to the process for manufacturing the photocatalytic composition according to which process, while stirring, the photocatalyzing agent and, where appropriate, the metal-ion-modified zeolites and/or active carbon are introduced into the colloidal aqueous siliceous suspension until a homogeneous suspension able to be applied directly to a support is obtained.

The invention therefore relates to the use of the photocatalytic composition in paint form.

The invention also relates to a filtering medium. As already stated, the expression "filtering medium" denotes the combination of a support and a photocatalytic composition. In a known manner, a filtering medium may be composed of one or more treated supports.

Thus, the photocatalytic composition of the invention may be deposited on at least one of the faces of a support. It has in fact been found that, by virtue of their self-bonding properties, the $SiO_2$ particles not only bond together, while coating the $TiO_2$ particles, but also bond to the support. Furthermore, and above all, a large increase in the efficiency of the photocatalysis is observed, this probably being due to the particular structure of the $SiO_2$ particles, which makes it possible to maintain a high porosity and a high specific surface area of the layer after drying.

Unlike the coating of a composition transparent to UV radiation described in document FR-A-2,749,777, the coating produced from the composition of the invention is opaque to UV radiation while maintaining optimum efficiency, which property may be used in fields of application of the type comprising displays, banners and wall papers.

Moreover, it is possible to use several types of supports, such as glass fibers or a nonwoven support, this been so in a nonlimiting manner.

In another embodiment, the support is in the form of an acoustic panel.

The term "acoustic panel" denotes in particular the tiles making up false ceilings.

In practice, the tile is coated with the photocatalytic composition.

Natural convection produces a movement of cold air from the bottom of the room which, while being heated, rises to the top of the room and thus comes into contact with the tiles making up the ceiling which, under the action of incandescent light or daylight, trigger a photocatalytic reaction resulting in the destruction of the gasses.

The support may also be an organic fibrous support of the paper type. It has in fact been found that the use of an aqueous colloidal dispersion of $SiO_2$ makes it possible to coat the organic fibers of the support so that said support is not exposed to the photocatalysis reaction and therefore does not deteriorate over time.

The use of the colloidal dispersion of $SiO_2$ on this type of support therefore makes it possible to increase the lifetime of the filtering medium.

According to an advantageous embodiment of the invention, only one face of the support of the filtering medium is coated with the photocatalytic composition of the invention, the other face being coated with a second composition capable of eliminating odors, comprising a derivative of undecylenic acid.

Advantageously, the derivative of undecylenic acid is sodium undecylenate or else methyl or ethyl undecylenate, this being so in a nonlimiting manner.

In order to destroy insects of the mite type, said second composition also includes dioctyl sulfosuccinate.

It has in fact being found that this type of composition makes it possible to combine and derive benefit from several different actions, namely:

that of the undecylenic acid derivative which eliminates the odors, especially of the type comprising amines, sulfur derivatives etc.

that of dioctyl sulfosuccinate which acts by destroying the keratin of mites.

In practice, said second composition contains, (by dry weight):

from 80 to 98%, advantageously 96%, sodium undecylenate;

from 2 to 20%, advantageously 4%, dioctyl sulfosuccinate.

In a variant, apart from a support coated with the photocatalytic composition, the filtering medium includes a prefilter in the form of a support coated with a composition capable of eliminating odors and destroying mite-type insects, comprising a derivative of undecylenic acid and of dioctyl sulfosuccinate.

The invention also relates to the process for manufacturing a filtering medium comprising a support on which the photocatalytic composition of the invention is coated in an amount from 5 to 40 g/m$^2$, advantageously 20 g/m$^2$, of $TiO_2$.

For a value of less than 5 g/m$^2$, the photocatalysis reaction is reduced on account of the too small a thickness of the layer of the photocatalytic composition on the support.

For a value greater than 40 g/m$^2$ no increase in the photocatalytic efficiency is observed.

In the embodiment in which the filtering medium has a support face or a prefilter coated with a composition based on undecylenic acid and on a sulfosuccinate, this coating is produced in an amount of 2 g/m$^2$.

Furthermore, the process for manufacturing the filtering medium of the invention has the advantage of being able to be carried out continuously, it being possible for the coating to be produced in particular on a size press, or any other conventional impregnation or coating process, thereby making the process very simple compared with the prior art.

In the case of wallpapers or acoustic panels, the composition of the invention may be in the form of a paint to be applied directly to the support.

These filtering media can therefore be used for the treatment and the purification of air, but also for the treatment of liquid effluents.

The invention and the advantages which stem therefrom will become more apparent from the following illustrative examples supported by the appended FIGURE, which shows the reaction efficiency of the photocatalytic composition forming the subject of the invention.

EXAMPLE 1

The following experiment shows the improvement in the adsorptivity and the photocatalytic efficiency of the photocatalytic composition of the invention compared with a filter medium of the prior art.

The test consists in immersing a support disk coated with a photocatalytic composition in an isopropyl alcohol solution and then exposing the disk to the action of ultraviolet radiation having a wavelength of less than 380 nanometers for 90 minutes. Under the effect of UV radiation, some of the isopropyl alcohol is converted into acetone and thus shows the photocatalytic efficiency of the titanium dioxide.

The disk consists of a fibrous support coated with a photocatalytic composition consisting of:

50 parts of binders 50 parts of $TiO_2$.

Examples 1, 2, 3 and 4 are produced using various types of $TiO_2$ coated in an amount from 4.5 to 17 g/m$^2$ on the disk, which has a surface area of 18 cm$^2$. The inorganic binder used is a colloidal dispersion of $SiO_2$ sold by Nissan under the trademark "SNOWTEX 50".

Example 5 uses a filtering medium sold by Matrix, in which the bonding of the $TiO_2$ to the support is achieved by calcining the binding agent. The analyses were carried out by gas chromatography.

The results are given in the following table:

TABLE 1

|  | Example 1 $TiO_2$ DT51[1] 16 g/m$^2$ | Example 2 $TiO_2$ REF2[2] 17 g/m$^2$ | Example 3 $TiO_2$ REF2 4.5 g/m$^2$ | Example 4 $TiO_2$ P-25[3] 12.5 g/m$^2$ | Example 5 Filtering medium Prior art[4] 2.88 g/m$^2$ |
|---|---|---|---|---|---|
| Amount of acetone formed/ μmol | 46 | 69 | 50 | 71 | 26.5 |

[1]DT 51 ®: $TiO_2$ sold by Rhodia
[2]REF2: $TiO_2$ having a specific surface area of 75 m$^2$/g
[3]Sold by Degussa
[4]Sold by Matrix.

It may be seen that the last disk causes a very small amount of acetone to be formed compared with the photocatalytic composition of the invention. It was also found that a $TiO_2$ coating of between 4.5 $g/m^2$ and 12.5 $g/m^2$ (Examples 3 and 4) makes it possible to obtain a high photocatalytic efficiency.

EXAMPLE 2

The reaction efficiency was calculated for various compositions according to the invention coated on a support of the nonwoven type (reference 1045) manufactured by Ahlstrom Lystil and perforated by the PERFOJET process so as to improve the through-flow (low pressure drop). The pollutant used is isobutane.

The composition contains two types of $TiO_2$ differing in specific surface area, namely 250 $m^2/g$ (REF 1) and 75 $m^2/g$ (REF 2), respectively.

All the essential parameters have been shown in the following table, namely the proportions of each of the constituents, the area irradiated, the irradiation time and the average reaction efficiency, and the amount of $TiO_2$ deposited, 10 or 20 $g/m^2$ (REF 1 or REF 2).

TABLE 2

| | Binder*/$TiO_2$ in parts as dry matter | Area ($cm^2$) | Irradiation time (h) | Average reaction efficiency (%) |
|---|---|---|---|---|
| 1A | 20/80 | 64.5 | 6 | 54.30 |
| REF 1 | | 65.8 | 6 | |
| 10 $g/m^2$ | | 65.8 | 6 | |
| 1B | 20/80 | 67.4 | 6 | 75.38 |
| REF 2 | | 67.5 | 6 | |
| 10 $g/m^2$ | | 65.7 | 6 | |
| 1C | 20/80 | 65.2 | 6 | 75.50 |
| REF 2 | | 65.4 | 6 | |
| 20 $g/m^2$ | | 65.7 | 6 | |
| 2A | 50/50 | 64.5 | 6 | 44.58 |
| REF 1 | | 64.8 | 6 | |
| 10 $g/m^2$ | | 68.2 | 6 | |
| 2A' | 50/50 | 67.8 | 5 | 36.40 |
| REF 1 | | 67.8 | 5 | |
| 10 $g/m^2$ | | 67.8 | 5 | |
| 2B | 50/50 | 66.2 | 6 | 88.52 |
| REF 2 | | 65.1 | 6 | |
| 10 $g/m^2$ | | 65.1 | 6 | |
| 2B' | 50/50 | 67.8 | 5 | 64.75 |
| REF 2 | | 67.8 | 5 | |
| 10 $g/m^2$ | | 67.8 | 5 | |
| 2C | 50/50 | 66.2 | 6 | 81.53 |
| REF 2 | | 66.2 | 6 | |
| 20 $g/m^2$ | | 66.4 | 6 | |
| 3B | 50/50 | 67.2 | 6 | 84.03 |
| REF 2 | | 67.2 | 6 | |
| 10 $g/m^2$ | | 67.2 | 6 | |
| 4B | 50/50 | 66.9 | 6 | 2.95 |
| REF 2 | | 64.8 | 6 | |
| 10 $g/m^2$ | | 66.9 | 6 | |
| | | | No C4H10 | |

*SNOWTEX 50 sold by Nissan.

It may be seen that the best reaction efficiencies are obtained for compositions of the invention containing 50 parts of the colloidal aqueous dispersion of silica ($SiO_2$) and 50 parts of titanium dioxide REF 2.

It should also be noted that 10 $g/m^2$ coatings of $TiO_2$ result in reaction efficiencies that are higher than in 20 $g/m^2$ coatings, all other conditions being the same, thereby reducing the cost of the filtering media.

When the trial is carried out without the isobutane organic pollutant, the photocatalytic efficiency is virtually zero, which is logical. It may be estimated that the low value obtained in this case (2.95%) corresponds to the decomposition of parasitic organic matter. The numbers in the table are therefore significant to within 3%.

The appended FIGURE shows the reaction efficiency obtained for photocatalytic $TiO_2$ compositions coated in an amount of 10 $g/m^2$ i.e., Examples 1A, 1B, 2A, 2A', 2B, 2B', 3B and 4B.

EXAMPLE 3

In this example, the efficiency of the photocatalytic composition of the invention including active carbon was evaluated.

To do this, a photocatalytic composition is coated on a nonwoven-type support (Reference 1045) manufactured by Ahlstrom Lystil and perforated by the PERFOJET process.

The photcatalytic composition consists of:
25% $TiO_2$ having a specific surface area of 250 $m^2/g$
25% active carbon having a specific surface area of 900 $m^2/g$, sold by CECA
50% by weight $SiO_2$ (SNOWTEX 50).

The medium is irradiated with methanol at a rate of 3.4 ml/minute, the pollutant content being equal to 281 ppm, with or without a saturation phase in the dark.

The results obtained at equilibrium under UV are identical whether or not the medium has been saturated.

The following were obtained:
an amount of methanol equal to 22.3 micromole per hour and per gram;
an amount of carbon dioxide ($CO_2$) equal to 8.65 micromole per hour and per gram.

The percentage of mineralization, that is to say of conversion of the polluting agent into $CO_2$ is 30%.

The carbon balance, resulting from the degradation of methanol into a volatile byproduct, is equal to 56%.

The advantages of the invention are clearly apparent from the description. In particular, the high adsorptivity and the remarkable efficiency of the $TiO_2$ when it is in a mixture with a colloidal aqueous dispersion of silica should be noted.

The simplification of the process for manufacturing the filtering medium, especially using continuous impregnation or coating, especially size-press, techniques, should also be noted.

What is claimed is:

1. A filtering medium comprising a support coated on at least one of its faces with a layer of a photocatalytic composition comprising at least one photocatalyzing agent and at least one inorganic binder derived from an aqueous colloidal dispersion comprising 20 to 50% by weight silicon particles, having a diameter of between 10 and 40 nanometers.

2. The filtering medium as claimed in claim 1, wherein the support is a fibrous support.

3. The filtering medium as claimed in claim 1, wherein the support is an acoustic panel.

4. The filtering medium as claimed in claim 1, a second surface of the support is coated with a second composition capable of eliminating odors, the second composition comprising a derivative of undecylenic acid.

5. The filtering medium as claimed in claim 4, characterized in that said second composition additionally comprises dioctyl sulfosuccinate capable of destroying mite-type insects.

6. The filtering medium as claimed in claim 1, additionally comprising a prefilter in the form of a support coated with said second composition capable of eliminating odors.

7. The filtering medium as claimed in claim 6, wherein said second composition additionally comprises dioctyl sulfosuccinate capable of destroying mite-type insects.

8. A filtering medium as claimed in claim 1, wherein the support is coated with the photocatalytic composition in an amount ranging from 5 to 40 $g/m^2$ of $TiO_2$.

9. A filtering medium as claimed in claims 6, wherein said second composition is coated in an amount of 2 g/m² on the support.

10. A method for treating a fluid containing organic pollutants, said method comprising:

providing a photocatalytic composition comprising at least one photocatalyzing agent and at least one inorganic binder derived from an aqueous colloidal dispersion comprising 20 to 50% by weight silicon particles, having a diameter of between 10 and 40 nanometers;

coating the photocatalytic composition on a support;

contacting the coated support with the fluid containing organic pollutants; and exposing the coated support to ultraviolet radiation; whereby organic pollutants contained in the fluid are degraded to carbon dioxide.

11. A method according to claim 10, wherein the fluid is air.

12. A method according to claim 10, wherein the fluid is a liquid effluent.

13. A method according to claim 10, wherein the support is a fibrous support.

14. A method according to claim 10, wherein the support is an acoustic panel.

15. A method according to claim 10, wherein the photocatalytic composition is in the form of a paint.

* * * * *